United States Patent [19]

Barringer, Jr. et al.

[11] Patent Number: 5,354,815

[45] Date of Patent: Oct. 11, 1994

[54] POLYMERS HAVING ENHANCED HYDROPHILICITY AND THERMAL REGULATED PROPERTIES AND PROCESS OF PRODUCING THE SAME

[75] Inventors: Lloyd F. Barringer, Jr., Rock Hill, S.C.; William T. Ledford, Gastonia, N.C.

[73] Assignee: Comfort Technologies, Gastonia, N.C.

[21] Appl. No.: 894,530

[22] Filed: Jun. 5, 1992

[51] Int. Cl.$^5$ .................. C08L 67/00; C08L 77/04
[52] U.S. Cl. .................. 525/431; 525/446; 524/262; 524/265; 524/267; 8/115.64; 8/DIG. 1; 8/DIG. 18
[58] Field of Search ............ 525/431, 446; 524/262, 524/265, 267; 8/DIG. 1, DIG. 18

[56] References Cited

U.S. PATENT DOCUMENTS

| | | |
|---|---|---|
| 2,807,865 | 10/1957 | Shippe et al. . |
| 3,097,185 | 7/1963 | Armen et al. . |
| 3,099,631 | 7/1963 | Tanner . |
| 3,252,880 | 5/1966 | Magat et al. . |
| 3,297,786 | 1/1967 | Horowitz . |
| 3,328,449 | 6/1967 | Haluska ............... 260/448.2 |
| 3,926,551 | 12/1975 | Okada et al. ........... 8/115.5 |
| 3,995,998 | 12/1976 | Rowland et al. ........ 8/115.6 |
| 4,135,877 | 1/1979 | Aikawa et al. .......... 8/115.5 |
| 4,238,193 | 12/1980 | Kisaichi et al. ......... 8/115.5 |
| 4,613,641 | 9/1986 | Haubennestel et al. ..... 524/267 |
| 4,614,675 | 9/1986 | Ona et al. ............... 427/387 |
| 4,640,962 | 3/1987 | Ostrozynski et al. ...... 525/474 |
| 4,761,445 | 8/1988 | Chiba ................... 524/262 |
| 4,806,125 | 2/1989 | Dyer .................... 8/116.1 |
| 4,808,188 | 2/1989 | Ledford et al. .......... 8/115.68 |
| 4,895,917 | 1/1990 | Gruning ................. 528/10 |
| 4,921,895 | 5/1990 | Schaefer et al. ......... 524/379 |
| 4,925,890 | 5/1990 | Leung et al. ............ 524/133 |
| 4,972,854 | 11/1990 | Kierman et al. ......... 131/353 |
| 5,000,861 | 3/1991 | Yang .................... 252/8.6 |
| 5,070,171 | 12/1991 | O'Lenick, Jr. ........... 528/33 |
| 5,132,392 | 7/1992 | DeYoung et al. ......... 528/772 |

FOREIGN PATENT DOCUMENTS

| | | |
|---|---|---|
| 2088738 | 8/1993 | Canada . |
| 62-149915 | 7/1987 | Japan . |
| 1005872 | 9/1965 | United Kingdom . |
| 1197567 | 7/1970 | United Kingdom . |
| 1301074 | 12/1972 | United Kingdom . |

*Primary Examiner*—Ralph H. Dean
*Attorney, Agent, or Firm*—Bell Seltzer Park & Gibson

[57] ABSTRACT

This invention relates to polymers having enhanced hydrophilicity and thermal regulative properties. Exemplary polymers include aliphatic polyamide polymers and polyester polymers. The polymer has bonded thereto a hydrophilic polysiloxane having an affinity for the polymer and having a molecular weight greater than about 1000 g/mol preferably greater than about 2000 g/mol, and preferably greater than about 4000 g/mol. The polymer has substantially no polymerization with the hydrophilic polysiloxane. Alternatively, an aliphatic polyamide polymer is provided having enhanced hydrophilicity and thermal regulative properties. The polymer has bonded thereto an anionic hydrophilic polysiloxane having an affinity for the aliphatic polyamide polymer. The aliphatic polyamide polymer has substantially no polymerization with the anionic hydrophilic siloxane.

12 Claims, No Drawings

POLYMERS HAVING ENHANCED HYDROPHILICITY AND THERMAL REGULATED PROPERTIES AND PROCESS OF PRODUCING THE SAME

FIELD AND BACKGROUND OF THE INVENTION

The present invention relates to polymers having enhanced hydrophilicity and thermal regulative properties and a process of producing the same.

Many polymers such as aliphatic polyamide polymers (e.g., nylon) and polyester polymers are inherently hydrophobic. Fabrics formed entirely from these polymers tend to exhibit poor moisture absorption and release properties and fail to provide thermal regulative properties. Typically in apparel fabrics, comfort is obtained by blending the aliphatic polyamide or polyester polymer fibers with hydrophilic fibers such as cotton fibers.

There are also various recognized methods for enhancing the hydrophilicity of the polymer. For example, aliphatic polyamide and polyester polymers can be treated with appropriate hydrophilic add-on agents or coatings. However, these add-on agents or coatings have not met with widespread acceptance particularly due to the lack of permanence under repeated laundering conditions.

Another method of enhancing hydrophilicity is the preparation of graft polymers of aliphatic polyamide and polyester polymers and appropriate hydrophilic comonomers. For example, U.S. Pat. No. 4,135,877 to Aikawa et al. proposes the graft polymerization of water-soluble vinyl monomers such as acrylic acid, acrylamide and N,N'-methylene-bisacrylamide onto polyamide fibers using heat and an aqueous treating solution containing acid. The graft polymerization of hydrophobic vinyl monomers with nylon, polypropylene and polyesters is proposed in U.S. Pat. No. 3,297,786 to Horowitz. See, also, for example, U.S. Pat. Nos. 3,099,631 to Tanner; 3,097,185 to Armen et al.; 3,252,880 to Magat et al.; and 3,278,639 to Matray. These graft polymerization techniques, however, often alter the structure of the aliphatic polyamide and polyester polymers. This can be counterproductive in that such altering of the structure results in the loss of other physical properties of the polymer such as hand, fabric strength and thermal regulative properties.

Despite the general availability of various add-on chemicals and graft polymerization techniques for improving hydrophilicity, there continues to be a desire for method improvements for enhancing the hydrophilicity and thermal regulative properties of polymers, particularly aliphatic polyamide and polyester polymers, and fibers and fabrics formed therefrom. For example, improvements in the retention of the hydrophilicity can improve the extended wearability and washability properties of the fabric made using the polymers. Adverse affects to other properties such as hand, fiber and fabric strength, flammability, etc. also must be avoided. The processing steps also must be controllable and not require additional steps to remove contaminants from the polymer or from the processing equipment.

It is therefore an object of the present invention to provide a polymer (e.g., aliphatic amide or polyester polymers) having enhanced hydrophilicity and thermal regulative properties, and a process for providing the same.

SUMMARY OF THE INVENTION

This invention relates to polymers having enhanced hydrophilicity and thermal regulative properties. Exemplary polymers include aliphatic polyamide polymers and polyester polymers. The polymer has bonded thereto a hydrophilic polysiloxane having an affinity for the polymer and having a molecular weight greater than about 1000 g/mol preferably greater than about 2000 g/mol, and preferably greater than about 4000 g/mol. The polymer has substantially no polymerization with the hydrophilic polysiloxane.

In a preferred embodiment, an aliphatic polyamide polymer is provided having enhanced hydrophilicity and thermal regulative properties. The polymer has bonded thereto an anionic hydrophilic polysiloxane having an affinity for the aliphatic polyamide polymer. The aliphatic polyamide polymer has substantially no polymerization with the anionic hydrophilic siloxane.

The present invention also provides a process of treating polymers to impart hydrophilicity and thermal regulative properties. The process comprises contacting the polymer (e.g., aliphatic polyamide or polyester) with an aqueous treatment bath containing a hydrophilic polysiloxane under conditions to bond the polymer with the hydrophilic polysiloxane while avoiding polymerization of the polymer with the hydrophilic polysiloxane.

DETAILED DESCRIPTION OF THE INVENTION

As summarized above, the present invention provides polymers such as aliphatic polyamide or polyester polymers having enhanced hydrophilicity and thermal regulative properties, and a process for doing the same. A hydrophilic polysiloxane is bonded to the polymer with substantially no polymerization therewith. The polymer is in the form of a fibrous textile substrate, e.g., fiber, web, yarn, thread, silver, woven fabric, knitted fabric, non-woven fabric, etc. The fibrous textile substrate is impregnated, padded, or otherwise contacted with an aqueous bath of the hydrophilic polysiloxane and fixed in the textile substrate in a batch process or any suitable continuous or semi-continuous process using conventional equipment. The hydrophilic polysiloxane can also be utilized in powder form and added directly to the polymer melt as a non-aqueous solution. The textile substrate can be formed solely of the polymer or can be blended in various proportions with each other, or with other materials such as cotton. Copolymers and terpolymers of the monomers of the polymer can also be utilized.

Preferred polymers are aliphatic polyamide polymers and polyester polymers. The term "aliphatic polyamide polymer" used herein and throughout the specification includes any long-chain polymeric or copolymeric amide which has recurring amide groups as an integral part of the main polymer or copolymer chain. Exemplary aliphatic polyamides include nylon 6 or poly($\omega$-caprolactam); nylon 66 or poly(hexamethyleneadipic acid) amide; poly(hexamethylene-sebacic acid) amide or nylon 610; and the like.

The term "polyester polymer" used herein and throughout the specification includes highly polymeric, essentially linear polyester. Polyester polymers can include, among others, linear polyesters of aromatic dicarboxylic acids and dihydric compounds such as polyethylene terephthalate, modified polyesters and copolymers, etc.

Suitable hydrophilic polysiloxanes are polysiloxanes bearing terminal and pendent hydroxyl and other anionic functionalities. These hydroxyl or other anionic functionalities can either attach to terminal silicon atoms on the polysiloxane backbone or are attached to alkyl groups pendant to the polysiloxane chain. In order to increase solubility, the hydroxyl groups can be alkoxylated, for example, using ethylene oxide or propylene oxide or both. The hydrophilic polysiloxanes of the present invention typically have a molecular weight greater than about 1000 g/mol, preferably greater than about 2000 g/mol, and more preferably greater than about 4000 g/mol.

In a preferred embodiment, the hydrophilic polysiloxane has one or more negative charges, namely it is an "anionic hydrophilic polysiloxane". The functionality of the anionic polysiloxane species has the following general formula:

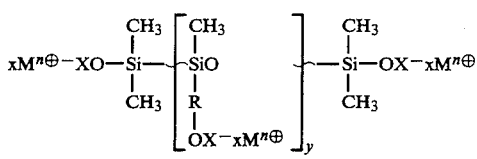

X is, but not limited to, phosphate, phosphonate, phosphorylate, sulfonate, sulfate, sulfone and carboxylate groups. R is $asp^3$ hybridized alkyl group of the formula $C_nH_{(2n+1)}$ with or without functional groups. M represents any metal, regardless of valence, or hydrogen ion, ammonium derivatives or any combination of Lewis acids that balances the overall charge of the molecule. n represents the number of metal or Lewis acid ions required to achieve a net ionic charge of zero. x represents the number of hydroxyl or anionic sites and is an integer from 1 to 6. y represents the number of monomeric alkyl groups pendant to the polysiloxane backbone.

The anionic hydrophilic polysiloxanes can have end groups capped with alkyl or vinyl silane groups to reduce the anionic character and to increase the molecular weight. Typically, the alkyl or vinyl silane groups are added by copolymerizing the hydrophilic polysiloxane and the alkyl or vinyl silane. Exemplary alkyl silanes include, but are not limited to, octyltriethoxysilane, methyltriethethoxysilane, methyltrimethoxysilane, and the like. Exemplary vinyl silanes include, but are not limited to, vinyltriethoxysilane, vinyltrimethoxysilane, vinyltris(2-methoxyethoxysilane), and the like. Other suitable silanes include γ-methacroxypropyltrimethoxysilane, β-(3,4-epoxycyclohexyl) ethyltrimethoxysilane, and γ-glycidoxypropyltrimethoxysilane. The resulting copolymer can be rendered anionic by the addition of phosphate, phosphonate, phosphorylate, sulfonate, sulfone, carboxylate, etc. groups. The copolymer can also be copolymerized with a carboxylate, and preferably an ethylenically unsaturated carboxylate (acrylic acid). Optionally, the copolymerization can occur in the presence of a catalyst such as a free radical catalyst (e.g., hydrogen peroxide).

Although applicants do not wish to be bound to any theory, it is believed that the following reaction is occuring between the anionic hydrophilic polysiloxane and the polarizable amine group of the aliphatic polyamide.

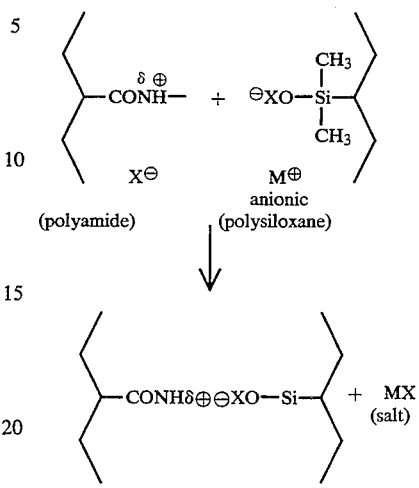

The anionic polysiloxane has an affinity for the polyamide. The bonding is believed to be a combination of electrostatic bonding and intermolecular hydrogen bonding, and the structure of the polyamide polymer is not substantially altered.

Other additives and auxiliaries can be included, such as softeners (to improve hand), dispersing agents, wetting agents, levelling agents, UV absorbing agents, IR absorbing agents, antistatic agents, water repellants, anti-foaming agents, oil repellent resins and chemicals, fluorescent brightening agents, bacteriostats, fungistats and the like. Alternatively, these and other treatments may be applied to the textile fiber substrate as a post-treatment finish.

In operation, the hydrophilic polysiloxane is preferably applied to the fibers of a textile substrate (e.g., fabric) using a batch-type process at 50° C. to 300° C. at about 1 to about 5 atm pressure. Pre-scouring of the fibers with a scouring agent such as with nonionic alcohol alkoxylates and derivatives thereof is preferred. Preferably about 0.5 to 3.0 percent based on the weight of the textile substrate of the scouring agent is used. The pre-scouring is typically done at 25° C. to 130° C. for 30 seconds to 2 hours.

The hydrophilic polysiloxane can be alkoxylated and/or substituted with an anionic group such as by phosphonation, sulfonation, phosphorylation, carboxylation, etc. The resulting anionic hydrophilic siloxane typically has a molecular weight of greater than about 1000 g/mole, and typically about 3000 to about 5000 g/mol. The anionic hydrophilic siloxane solution can be partially neutralized with a neutralizing agent to a pH of from about 2 to 7, and preferably 3 to 5. Exemplary neutralizing agents are formic acid and alkaline salts such as potassium hydroxide and potassium carbonate. The amount of neutralizing agent is from about 0.5 to about 5.0 percent based on the weight of the substrate.

A bath of the hydrophilic polysiloxane of 0.5 to 10 percent by weight based on the weight of the textile fabric substrate is prepared. The fabric is passed through the bath with a wet pickup of from about 0.05 to 200 percent based on the weight of the substrate. Optionally dispersing agents such as aromatic sulfonate/formaldehyde condensates, polycarboxylates and phosphates of alcohols and alkoxylated alcohols can be added. In particular, partially neutralized salts of polyacrylic acid have been employed in this process; e.g., polyacrylic acid partially neutralized to a pH of about 3 to about 4 with potassium hydroxide or potassium carbonate are examples. The application level of such dispersing agents in the actual bath ranges from 0.5 to 5.0 percent based on the weight of the textile fabric substrate. More preferred is an application range of 1.0 to 4.0 percent and most preferably an application range of 2.0 to 3.0 percent based on the weight of the textile substrate.

Additional benefits and advantages of the invention will be apparent from the following illustrative examples.

NYLON EXAMPLES

Example 1

A nylon 6,6 fabric is prepared by knitting nylon 6,6 obtained from Fab Industries of Lincolnton, N.C. The fabric is cut into swatches for treatment. A 2 percent solution by weight of fabric of Magnasoft TLC, a hydrophilic hexaalkoxypolysiloxane copolymer available from Union Carbide of Danbury, Conn., is sulfonated with chlorosulfonic acid so that one of the six available hydroxyl sites of the polysiloxane is replaced by a sulfonate group. The solution is applied to the nylon 6,6 fabric substrate at 100° C. at atmospheric pressure.

Physical testing is conducted to determine wickability and disperability. The swatches are dried after thoroughly rinsing. Wickability is evaluated by the degree and rate of vertical absorption of water onto the fabric held lengthwise into a beaker containing room temperature tap water. Measurement includes vertical distance "climbed" by the water over a sixty second period with 0.25 inches of the fabric held subsurface in the water. Dispersibility tests were conducted by placing one drop of tap water from an eyedropper onto the fabric substrate and measuring the diameter of the drop after one minute. The wicking distance of the fabric is 2.75 inches and the dispersal diameter is 0.50 inches.

Example 2

In order to demonstrate the effectiveness of the additional sulfonation of the hydrophilic polysiloxane, Example 1 is repeated except six of the available hydroxyl sites of the polysiloxane are replaced by sulfonate groups. The resulting fabric swatch has a wicking distance of 3.00 inches and a dispersal diameter of 0.50 inches.

Example 3

In order to demonstrate the effectiveness of phosphating the hydrophilic polysiloxane with phosphoric anhydride, Example 1 is repeated except one of the available hydroxyl sites of the polysiloxane is replaced by a phosphate group. The resulting fabric swatch has a wicking distance of 2.75 inches and a dispersal diameter of 0.375 inches.

Example 4

In order to demonstrate the effectiveness of additional phosphation of the hydrophilic polysiloxane, Example 3 is repeated except three of the available hydroxyl sites of the polysiloxane are replaced by phosphate groups. The resulting fabric swatch has a wicking distance of 2.75 inches and a dispersal diameter of 0.375 inches.

Example 5

In order to demonstrate the effectiveness of carboxylating the hydrophilic polysiloxane, Example 1 is repeated except one of the available hydroxyl sites of the polysiloxane is replaced by a methylene carboxylate group. The resulting fabric swatch has a wicking distance of 1.50 inches and a dispersal diameter of 0.25 inches.

Example 6

In order to demonstrate the effectiveness of additional carboxylation of the polysiloxane, Example 5 is repeated except three of the available hydroxyl sites of the polysiloxane are replaced by methylene carboxylate groups. The resulting fabric swatch has a wicking distance of 1.75 inches and a dispersal diameter of 0.25 inches.

Example 7

In order to demonstrate the effectiveness of capping the hydrophilic polysiloxane with an alkyl silane group, one of the hydroxyl groups of the hydrophilic hexaalkoxypolysiloxane (Magnasoft TLC) of Example 1 is capped with methyltrimethoxysilane available from Union Carbide of Danbury, Conn. as A-163, and Example 1 is repeated except with no sulfonation. The resulting fabric swatch has a wicking distance of 2.50 inches and a dispersal diameter of 0.50 inches.

Example 8

In order to demonstrate the effectiveness of sulfonating the copolymer of Example 7, Example 7 is repeated except one of the available hydroxyl sites of the hexaalkoxypolysiloxane is replaced by a sulfonate group by the additon of chlorosulfonic acid. The resulting fabric swatch has a wicking distance of 2.50 inches and a dispersal diameter of 0.50 inches.

Example 9

In order to demonstrate the effectiveness of completely capping the hydrophilic polysiloxane with alkyl silane groups, all of the hydroxyl groups of the hydrophilic hexaalkoxypolysiloxane (Magnasoft TLC) of Example 1 are capped with octyltriethoxysilane available from Union Carbide of Danbury, Conn. as A-137, and Example 1 is repeated except with no sulfonation. The resulting fabric swatch has a wicking distance of 2.75 inches and a dispersal diameter of 0.50 inches.

Example 10

In order to demonstrate the effectiveness of phosphating the copolymer of Example 7, Example 7 is repeated except one of the available hydroxyl sites of the hexaaalkoxypolysiloxane is replaced by a phosphate group by adding phosphoric anhydride. The resulting fabric swatch has a wicking distance of 2.75 inches and a dispersal diameter of 0.625 inches.

Example 11

In order to demonstrate the effectiveness of the additional phosphating, Example 10 is repeated except three of the sites are replaced by phosphate groups. The resulting fabric swatch had a wicking distance of 3.00 inches and a dispersal diameter of 0.50 inches.

Example 12

In order to demonstrate the effectiveness of capping the hydrophilic polysiloxane with a vinyl silane group, one of the hydroxyl groups of the hydrophilic hexaalkoxypolysiloxane (Magnasoft TLC) of Example 1 is capped with vinyltriethoxysilane available from Union Carbide of Danbury, Conn. as A-151, and Example 1 is repeated except with no sulfonation. The resulting fabric swatch has a wicking distance of 2.75 inches and a dispersal diameter of 0.50 inches.

Example 13

In order to demonstrate the effectiveness of completely capping the hydrophilic polysiloxane with vinyl silane groups, all of the hydroxyl groups of the hydrophilic hexaalkoxypolysiloxane (Magnasoft TLC) of Example 1 are capped with vinyltriethoxysilane, and Example 1 is repeated except with no sulfonation. The resulting fabric swatch had a wicking distance of 2.75 inches and a dispersal diameter of 0.50 inches.

Example 14

In order to demonstrate the effectiveness of further polymerizing the copolymer of a vinyl silane and polysiloxane, with an ethylenically unsaturated carboxylate, Example 12 is repeated except the copolymer thereof is polymerized with acrylic acid. The resulting fabric has a wicking distance of 2.50 inches and a dispersal diameter of 0.50 inches.

Example 15

In order to demonstrate the effectiveness of further polymerizing the copolymer of Example 13 with an ethylenically unsaturated carboxylate, Example 13 is repeated except the copolymer thereof is further polymerized with acrylic acid. The resulting fabric has a wicking distance of 2.0 inches and a dispersal diameter of 0.40 inches.

Nylon Control

An untreated nylon fabric swatch is prepared according to claim 1 was tested for wickability and dispersability. The resulting fabric swatch had a wicking distance of 0.75 inches and a dispersal diameter of 0.00 inches.

The results of Examples 1-15 indicate that improved wickability and dispersability, and thus improved hydrophilicity and thermal regulative properties can be provided by the use of present treatment as compared to the untreated fabric of the control.

POLYESTER EXAMPLES

Example 16

A polyester fabric is prepared by knitting polyester 656 obtained from DuPont, Wilmington, Del. wherein the first bar denier is 40/20 (86 percent) and the second bar denier is 60/34 (14 percent). The fabric is cut into swatches. A 2 percent solution by weight of fabric of hexaalkoxypolysiloxane copolymer (Magnasoft TLC) is sulfonated with chlorosulfonic acid so that one of the six available hydroxyl sites of the polysiloxane is replaced by a sulfonate group. The solution is applied at 120° C. under a pressure of 2 atm. The resulting fabric swatch has a wicking distance of 2.00 inches and a dispersal diameter of 0.50 inches.

Example 17

In order to demonstrate the effectiveness of the additional sulfonation of the polysiloxane, Example 16 is repeated except six of the available hydroxyl sites of the polysiloxane are replaced by a sulfonate group. The resulting fabric swatch has a wicking distance of 2.50 inches and a dispersal diameter of 0.50 inches.

Example 18

In order to demonstrate the effectiveness of phosphating the polysiloxane with phosphoric anhydride, Example 16 is repeated except one of the available hydroxyl sites of the polysiloxane are replaced by a phosphate group. The resulting fabric swatch has a wicking distance of 2.00 inches and a dispersal diameter of 0.50 inches.

Example 19

In order to demonstrate the effectiveness of additional phosphating of the polysiloxane, Example 18 is repeated except three of the available hydroxyl sites of the polysiloxane are replaced by phosphate groups. The resulting fabric swatch had a wicking distance of 2.50 inches and a dispersal diameter of 0.50 inches.

Example 20

In order to demonstrate the effectiveness of carboxylating the polysiloxane, Example 16 is repeated except one of the available hydroxyl sites of the polysiloxane are replaced by an methylene carboxlate group. The resulting fabric swatch had a wicking distance of 2.50 inches and a dispersal diameter of 0.50 inches.

Example 21

In order to demonstrate the effectiveness of additional carboxylating of the polysiloxane, Example 20 is repeated except three of the available hydroxyl sites of the polysiloxane are replaced by methylene carboxylate groups. The resulting fabric swatch has a wicking distance of 2.50 inches and a dispersal diameter of 0.50 inches.

Example 22

In order to demonstrate the effectiveness of capping the hydrophilic polysiloxane with an alkyl silane group, one of the hydroxyl groups of the hydrophilic hexaalkoxypolysiloxane (Magnasoft TLC) of Example 1 is capped with methyltrimethoxysilane, and Example 16 is repeated except with no sulfonation. The resulting fabric swatch has a wicking distance of 2.75 inches and a dispersal diameter of 0.50 inches.

Example 23

In order to demonstrate the effectiveness of sulfonating the copolymer of Example 22, Example 22 is repeated except one of the available hydroxyl sites of the hexaaalkoxypolysiloxane is replaced by a sulfonate group by the additon of chlorosulfonic acid. The resulting fabric swatch has a wicking distance of 3.00 inches and a dispersal diameter of 0.50 inches.

Example 24

In order to demonstrate the effectiveness of completely capping the hydrophilic polysiloxane with alkyl silane groups, all of the hydroxyl groups of the hydrophilic hexaalkoxypolysiloxane (Magnasoft TLC) of Example 1 are capped with octyltriethoxysilane, and Example 16 is repeated except with no sulfonation. The resulting fabric swatch has a wicking distance of 2.50 inches and a dispersal diameter of 0.50 inches.

Example 25

In order to demonstrate the effectiveness of phosphating the copolymer of Example 22, Example 22 is repeated except one of the available hydroxyl sites of the hexaalkoxypolysiloxane is replaced by a phosphate group. The resulting fabric swatch has a wicking distance of 2,625 inches and a dispersal diameter of 0.650 inches.

Example 26

In order to demonstrate the effectiveness of the addition of additional phosphate groups, Example 25 is repeated except three of the sites are replaced by phosphate groups. The resulting fabric swatch had a wicking distance of 3.00 inches and a dispersal diameter of 0.50 inches.

Example 27

In order to demonstrate the effectiveness of capping the hydrophilic polysiloxane with a vinyl silane group, one of the hydroxyl groups of the hydrophilic hexaalkoxypolysiloxane (Magnasoft TLC) of Example 1 is capped with vinyltriethyoxysilane, and Example 16 is repeated except with no sulfonation. The resulting fabric swatch had a wicking distance of 2.25 inches and a dispersal diameter of 0.50 inches.

Example 28

In order to demonstrate the effectiveness of completely capping the hydrophilic polysiloxane with vinyl silane groups, all of the hydroxyl groups of the hydrophilic hexaalkoxypolysiloxane (Magnasoft TLC) of Example 1 are capped with vinyltriethoxysilane, and Example 16 is repeated except with no sulfonation. The resulting fabric swatch has a wicking distance of 2.625 inches and a dispersal diameter of 0.50 inches.

Example 29

In order to demonstrate the effectiveness of further polymerizing the copolymer of a vinyl silane and polysiloxane, with an ethylenically unsaturated carboxylate, Example 28 is repeated except the copolymer thereof is polymerized with acrylic acid. The resulting fabric has a wicking distance of 3.00 inches and a dispersal diameter of 1.0 inches.

Example 30

In order to demonstrate the effectiveness of further polymerizing the copolymer of Example 28 with an ethylenically unsaturated carboxylate, Example 28 is repeated except the copolymer thereof is further polymerized with acrylic acid. The resulting fabric has a wicking distance of 2.75 inches and a dispersal diameter of 0.75 inches.

Polyester Control

An untreated polyester fabric swatch was tested for wickability and dispersability. The resulting fabric swatch has a wicking distance of 0.00 inches and a dispersal diameter of 0.00 inches.

The results of Examples 16–30 indicate that improved wickability and dispersability, and thus improved hydrophilicity and thermal regulative properties can be provided by the use of present treatment as compared to the untreated fabric of the control.

In the specification and examples, there have been disclosed preferred embodiments of the invention, although specific terms are employed, they are used in a generic and descriptive sense only and not for the purpose of limitation, the scope of the invention being defined by the following claims.

That which is claimed is:

1. An aliphatic polyamide or polyester polymer having enhanced hydrophilicity and thermal regularitive properties, said polymer having bonded thereto a hydrophilic anionic polysiloxane polymer having a molecular weight greater than about 1000 g/mol and having an affinity for said polymer, said polymer having substantially no polymerization with the hydrophilic anionic polysiloxane polymer, said hydrophilic polysiloxane anionic polymer having the formula

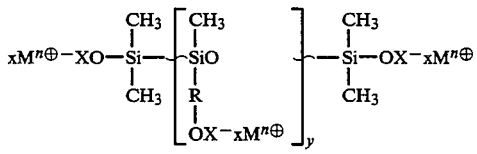

wherein X is selected from the group consisting of phosphate, phosphonate, phosphorylate, sulfonate, sulfate, sulfone and carboxylate groups; R is a sp$^3$ hybridized alkylene group with or without functional groups; M represents any metal, hydrogen ion, ammonium derivatives or any combination of Lewis acids that balances the overall charge of the molecule; n represents the number of metal or Lewis acid ions required to achieve a net ionic charge of zero; x is an integer from 1 to 6; and v represents the number of a monomeric alkyl groups pendant to the polysiloxane backbone.

2. An aliphatic polyamide or polyester polymer according to claim 1 wherein the hydrophilic polysiloxane polymer is a reaction product of polysiloxane and a vinyl or alkyl silane.

3. The polymer according to claim 1 wherein X is a sulfate group.

4. The polymer according to claim 1 wherein X is a phosphate group.

5. The polymer according to claim 1 wherein X is a carboxylate group.

6. The polymer according to claim 2, wherein the anionic hydrophilic copolymer is copolymerized with an ethylenically unsaturated carboxylate.

7. The process of treating a polymer to impart hydrophilicity and thermal regulative properties thereto, the process comprising contacting the polymer with an aqueous treatment bath containing a hydrophilic polysiloxane polymer having a molecular weight greater than about 1000 g/mol under conditions sufficient to bond the polymer and hydrophilic polysiloxane while avoiding polymerization of the polymer with the hydrophilic polysiloxane polymer; wherein the hydrophilic polysiloxane polymer has the formula

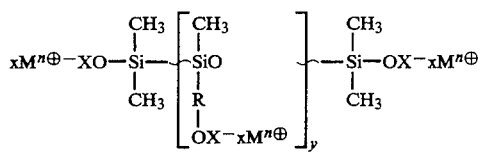

wherein X is selected from the group consisting of phosphate, phosphonate, phosphorylate, sulfonate, sulfate, sulfone and carboxylate groups; R is a sp$^3$ hybridized alkylene group with or without functional groups; M represents any metal, hydrogen ion, ammonium derivatives or any combination of Lewis acids that balances the overall charge of the molecule; n represents the number of metal or Lewis acid ions required to achieve a net ionic charge of zero; x is an integer from 1 to 6; and v represents the number of monomeric alkyl groupq pendant to the polysiloxane backbone.

8. The process of claim 7 wherein the hydrophilic polysiloxane polymer is a reaction product of a polysiloxane and a vinyl or alkyl silane.

9. The process according to claim 7, wherein X is a sulfate group.

10. The process according to claim 7, wherein X is a phosphate group.

11. The process according to claim 7, wherein X is a carboxylate group.

12. The process according to claim 8, wherein the anionic hydrophilic copolymer is copolymerized with an ethylenically unsaturated carboxylate.

* * * * *

UNITED STATES PATENT AND TRADEMARK OFFICE
CERTIFICATE OF CORRECTION

PATENT NO. : 5,354,815
DATED : October 11, 1994
INVENTOR(S) : Barringer, Jr. et al.

It is certified that error appears in the above-indentified patent and that said Letters Patent is hereby corrected as shown below:

Column 3, Line 33, after "R is" delete "asp$^3$" and insert --a sp$^3$--.

Column 9, Line 11, after "of" delete "2,625" and insert --2.625--.

Signed and Sealed this

Thirty-first Day of January, 1995

*Attest:*

BRUCE LEHMAN

*Attesting Officer*   Commissioner of Patents and Trademarks